United States Patent [19]

Suzuki et al.

[11] Patent Number: 5,101,401
[45] Date of Patent: Mar. 31, 1992

[54] POLARITY JUDGING ARRANGEMENT BY USING FRAME SYNCHRONIZATION SIGNALS OF A RECEIVED SIGNAL

[75] Inventors: Toshio Suzuki; Kenji Kanetake, both of Tokyo, Japan

[73] Assignee: NEC Corporation, Tokyo, Japan

[21] Appl. No.: 619,837

[22] Filed: Nov. 29, 1990

[30] Foreign Application Priority Data

Nov. 29, 1989 [JP] Japan .................................. 1-309555

[51] Int. Cl.[5] ............................ H04J 1/16; H04J 3/06
[52] U.S. Cl. ........................................ 370/13; 370/106
[58] Field of Search ................... 370/13, 13.1, 14, 16, 370/16.1, 17, 106, 105.4, 105.1, 119; 328/118, 140; 307/231, 236; 361/245, 246, 77

[56] References Cited

U.S. PATENT DOCUMENTS

| | | | |
|---|---|---|---|
| 4,070,646 | 1/1978 | Sandlin | 328/118 |
| 4,176,248 | 11/1979 | Sheets | 361/246 |
| 4,665,533 | 5/1987 | Tomikawa | 370/106 |
| 4,731,827 | 3/1988 | Wood | 328/118 |
| 4,768,192 | 8/1988 | Pattavina et al. | 370/105.4 |
| 4,860,311 | 8/1989 | Storberg | 361/246 |

Primary Examiner—Douglas W. Olms
Assistant Examiner—H. Kizou
Attorney, Agent, or Firm—Helfgott & Karas

[57] ABSTRACT

In order to judge whether a received digital signal has a true polarity or an inverted polarity, a polarity judging arrangement comprises first and second synchronization word detecting circuits for detecting, from the received digital signal, first and second predetermined synchronization words for multiframe and frame synchronization signals, respectively. The second predetermined synchronization word is defined by inverting the first predetermined synchronization word. Each multiframe has at least two frame synchronization signals. A counting circuit has an initial value and counts down and up a count in response to first and second detection pulses produced by the first and the second synchronization word detecting circuits, respectively. The counting circuit produces first and second judgement result signals representative of the true and the inverted polarities when the count increases up to an upper threshold value and when the count decreases down to a lower threshold value, respectively. The upper threshold value is higher than the initial value by a preselected value M, M representing an integer greater than one. The lower threshold value is lower than the initial value by the preselected value. Use may be made of another counting circuit which counts up and down a count in response to the first and the second detection pulses, respectively.

10 Claims, 5 Drawing Sheets

POLARITY JUDGING ARRANGEMENT BY USING FRAME SYNCHRONIZATION SIGNALS OF A RECEIVED SIGNAL

BACKGROUND OF THE INVENTION

This invention relates to a polarity judging arrangement for use in a reception section of a digital transmission network comprising a transmission section and a transmission line between the reception and the transmission sections.

The digital transmission network is typically an ISDN (integrated services digital network). The transmission line is typically a two-wire metallic cable. The transmission section transmits a time division multiplexed digital signal to the transmission line. The time division multiplexed digital signal may be a multilevel code signal.

The time division multiplexed digital signal comprises successive multiframes each of which comprises first, second, ..., and N-th frames, where N represents an integer greater than two. The first frames of each multiframe comprises a multiframe synchronization signal representative of a first predetermined synchronization word and a transmission data signal which succeeds the multiframe synchronization signal. The first predetermined synchronization word consists of at least one symbol.

Each of the second through the N-th frames of each multiframe comprises a frame synchronization signal representative of a second predetermined synchronization word and another transmission data signal which succeeds the frame synchronization signal. In the ISDN, the second predetermined synchronization word is generally defined by inverting the first predetermined synchronization word.

The reception section receives the time division multiplexed digital signal from the transmission line as a received digital signal. The received digital signal has a true polarity equivalent to a polarity of the time division multiplexed digital signal when the transmission line of a two-wire metallic cable is correctly or normally connected in polarity between the transmission and the reception sections. When the transmission line is incorrectly or inversely connected in polarity between the transmission and the reception sections, the received digital signal has an inverted polarity relative to the true polarity.

In order to correctly decode the transmission data signal in the reception section no matter whether the transmission line is connected correctly or incorrectly in polarity between the transmission and the reception sections, a polarity judging arrangement is required which is for use in the reception section and for judging whether the received digital signal has the true polarity or the inverted polarity.

SUMMARY OF THE INVENTION

It is therefore an object of this invention to provide a polarity judging arrangement which is for use in a reception section of a digital transmission network and which is for judging whether a received digital signal has a true polarity or an inverted polarity.

It is another object of this invention to provide a polarity judging arrangement of the type described, which can judge, by the use of frame synchronization signal of the received digital signal, whether the received digital signal has the true polarity or the inverted polarity.

It is still another object of this invention to provide a polarity judging arrangement of the type described, which has a simple structure.

Other objects of this invention will become clear as the description proceeds.

On describing the gist of this invention, it is possible to understand that a polarity judging arrangement is for use in a reception section of a digital transmission network comprising a transmission section and a transmission line between the transmission and the reception sections. The transmission section transmits to the transmission line a time division multiplexed digital signal comprising successive multiframes, each comprising first, second, ..., and N-th frames, where N represents a first integer greater than two. The first frame of each multiframe comprises a multiframe synchronization signal representative of a first predetermined synchronization word and a transmission data signal which succeeds the multiframe synchronization signal. Each of the second through the N-th frames of each multiframe comprises a frame synchronization signal representative of a second predetermined synchronization word and another transmission data signal which succeeds the frame synchronization signal. The second predetermined synchronization word is defined by inverting the first predetermined synchronization word. The reception section receives, as a received digital signal, the time division multiplexed digital signal from said transmission line. The received digital signal has a true polarity equivalent to a polarity of the time division multiplexed digital signal when the transmission line is correctly connected in polarity between the transmission and the reception sections. The received digital signal has an inverted polarity relative to the true polarity when the transmission line is incorrectly connected in polarity between the transmission and the reception sections. The polarity judging arrangment is for judging whether the received digital signal has the true polarity or the inverted polarity. The polarity judging arrangement thereby produces first and second judgement result signals when the polarity judging arrangement judges that the received digital signal has the true polarity and that the received digital signal has the inverted polarity, respectively. The first and the second judgement result signals represent that the received digital signal has the true polarity and that the received digital signal has the inverted polarity, respectively.

According to an aspect of this invention, the above-understood polarity judging arrangement comprises: first synchronization word detecting means supplied with the received digital signal for detecting the first predetermined synchronization word to produce a first detection pulse whenever the first synchronization word detecting means detects the first predetermined synchronization word, second synchronization word detecting means supplied with the received digital for detecting the second predetermined synchronization word to produce a second detection pulse whenever the second synchronization word detecting means detects the second predetermined synchronization word; and counting means connected to the first and the second synchronization word detecting means and having an initial value, an upper threshold value, and a lower threshold value. The upper threshold value is higher than the initial value by a preselected value M, where M represents a second integer greater than one. The lower threshold value is lower than the initial value by the preselected value. The counting means is for counting down and up a count in response to the first and the second detection pulses, respectively, to produce the first and the second judgment result signals when the count increases up to the upper threshold value and when the count decreases down to the lower threshold value, respectively.

According to another aspect of this invention, the above-understood polarity judging arrangement comprises: first synchronization word detecting means supplied with the received digital signal for detecting the first predetermined synchronization word to produce a first detection pulse whenever the first synchronization word detecting means detects the first predetermined synchronization word; second synchronization word detecting means supplied with the received digital signal for detecting the second predetermined synchronization word to produce a second detection pulse whenever the second synchronization word detecting means detects the second predetermined synchronization word; and counting means connected to the first and the second synchronization word detecting means and having an initial value, an upper threshold value, and a lower threshold value. The upper threshold value is higher than the initial value by a preselected value M, where M represents a second integer greater than one. The lower threshold value is lower than said initial value by the preselected value. The counting means is for counting up and down a count in response to the first and the second detection pulses, respectively, to produce the first and the second judgement result signal when the count decreases down to the lower threshold value and when the count increases up to the upper threshold value, respectively.

DESCRIPTION OF THE PREFERRED EMBODIMENTS

Figure 1:
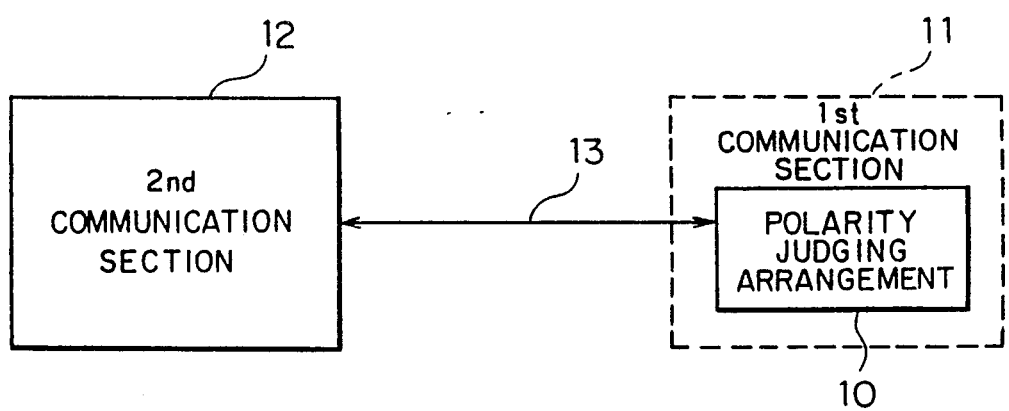
FIG. 1 is a block diagram of a digital transmission network comprising a first communication section having a polarity judging arrangement according to a first embodiment of this invention.

Referring to FIG. 1, a polarity judging arrangement 10 according to a first embodiment of this invention is for use in a first communication section 11 which currently serves as a reception section of a digital transmission network. The digital transmission network is typically an ISDN (integrated services digital network) and comprises a second communication section 12 and a transmission line 13 between the first and the second communication sections 11 and 12. Although it will be supposed that the second communication section 12 currently serves as a transmission section, the second communication section 12 also comprises a similar polarity judging arrangement which operates when the second communication section 12 serves as a reception section. The transmission line 13 is typically a two-wire metallic cable. The second communication section 12 transmits a time division multiplexed digital signal to the transmission line 13.

Figure 2:
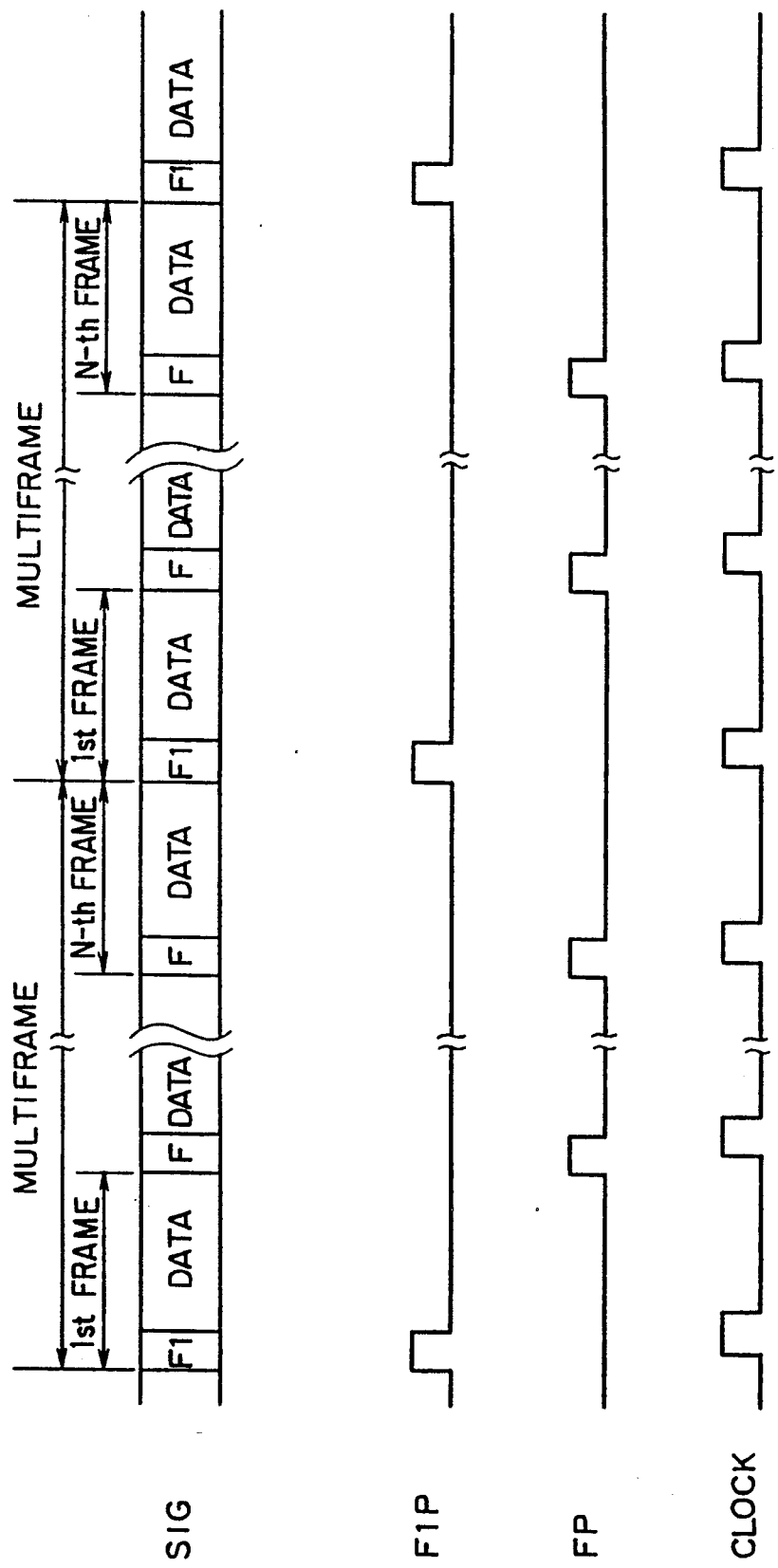
FIG. 2 is a time chart for use in describing operation of the polarity judging arrangement illustrated in FIG. 1.

Turning to FIG. 2, the time division multiplexed digital signal is labelled SIG and is depicted along a top line. The time division multiplexed digital signal SIG comprises successive multiframes of a common multiframe period. Each multiframe comprises first, second, ..., and N-th frames of a common frame period, where N represents a first integer greater than two. The first frames of each multiframe comprises a multiframe synchronization signal and a transmission data signal which succeeds the multiframe synchronization signal. The multiframe synchronization signal and the transmission data signal are labelled F1 and DATA, respectively. The multiframe synchronization signal F1 represents a first predetermined synchronization word consisting of at least one symbol.

Each of the second through the N-th frames of each multiframe comprises a frame synchronization signal labelled F and another transmission data signal which succeeds the frame synchronization signal F and which is also labelled DATA. The frame synchronization signal F represents a second predetermined synchronization word. It will be assumed that the second predetermined synchronization word is defined by inverting the first predetermined synchronization word.

Figure 3:
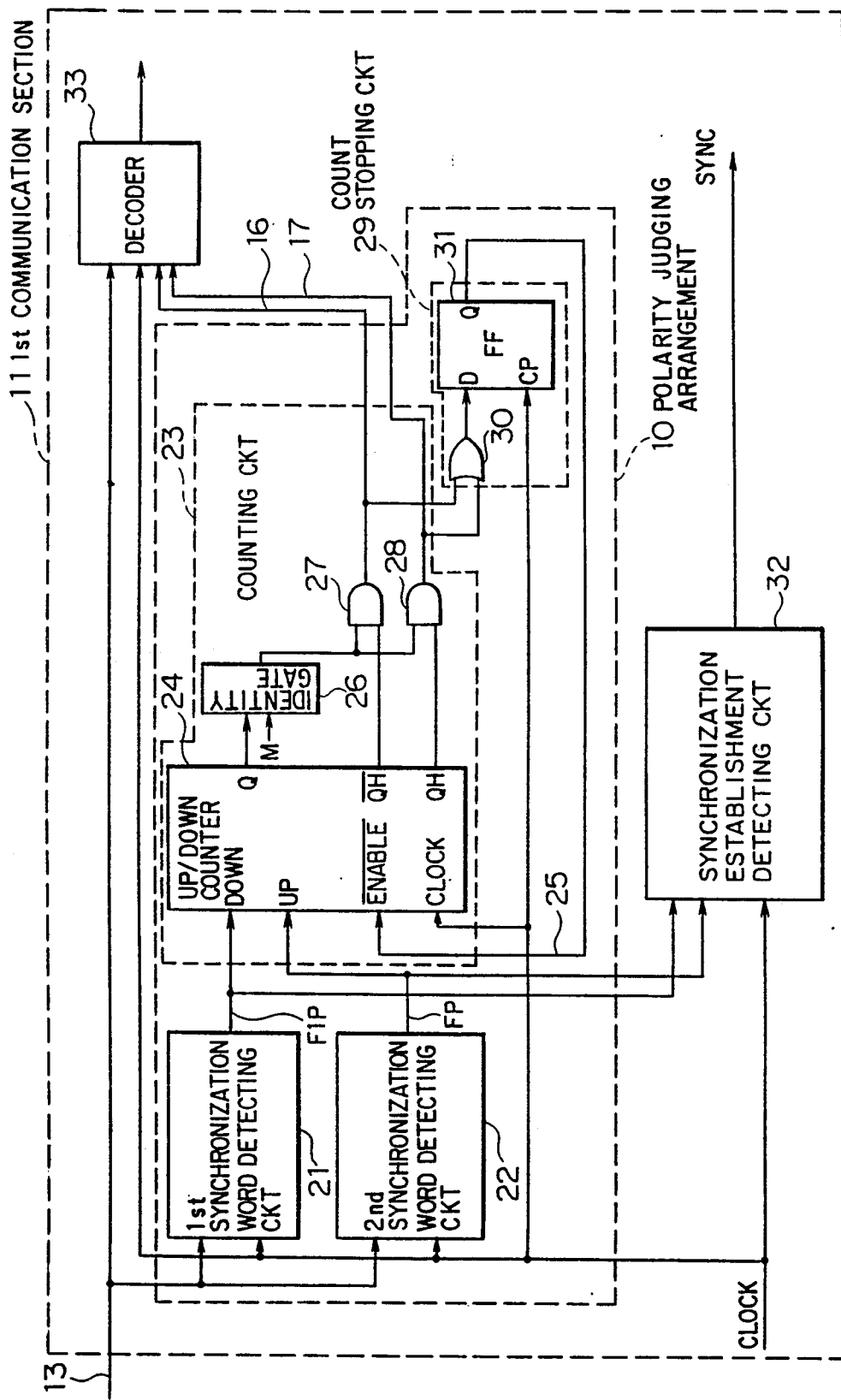
FIG. 3 is a block diagram of the first communication section comprising the polarity judging arrangement illustrated in FIG. 1.

Turning to FIG. 3, the first communication section 11 receives the time division multiplexed digital signal from the transmission line 13 as a received digital signal. The received digital signal has a true polarity equivalent to a polarity of the time division multiplexed digital signal when the transmission line 13 of a two-wire metallic cable is correctly or normally connected in polarity between the first and the second communication sections 11 and 12 (FIG. 1). When the transmission line 13 is incorrectly or inversely connected in polarity between the first and the second communication sections 11 and 12, the received digital signal has an inverted polarity relative to the true polarity.

The polarity judging arrangement 10 is for judging whether the received digital signal has the true polarity or the inverted polarity. The polarity judging arrangement 10 thereby produces first and second judgement result signals 16 and 17 when the polarity judging arrangement 10 judges that said received digital signal has said true polarity and that said received digital signal has said inverted polarity, respectively. The first and the second judgement result signals 16 and 17 represent that the received digital signal has the true polarity and that the received digital signal has the inverted polarity, respectively.

The polarity judging arrangement 10 comprises first and second synchronization word detecting circuits 21 and 22. Supplied with the received digital signal, the first synchronization word detecting circuit 21 detects the first predetermined synchronization word in synchronism with a clock signal CLOCK and produces a first detection pulse F1P whenever the first synchronization word detecting circuit 21 detects the first predetermined synchronization word. Supplied with the received digital signal, the second synchronization word detecting circuit 22 detects the second predetermined synchronization word in synchronism with the clock signal CLOCK and produces a second detection pulse FP whenever the second synchronization word detecting circuit 22 detects the second predetermined synchronization word. The first and the second detection pulses F1P and FP are depicted along second and third lines in FIG. 2, respectively. The clock signal CLOCK is depicted along a bottom line in FIG. 2.

With reference to FIG. 3 continued, a counting circuit 23 comprises an up/down counter 24 having count down and count up terminals DOWN and UP which are connected to the first and the second synchronization word detecting circuits 21 and 22, respectively. The up/down counter 24 has an initial value of, for example, zero, and an enable terminal $\overline{\text{ENABLE}}$. When the enable terminal $\overline{\text{ENABLE}}$ is supplied with a control signal 25 of a logic "0" level, the up/down counter 24 counts down and up a count in response to the first and the second detection pulses, respectively, and in synchronism with the clock signal CLOCK and produces the count as a counted value. When the enable terminal $\overline{\text{ENABLE}}$ is supplied with the control signal 25 of a logic "1" level, the up/down counter 24 stops such counting operation and holds the count as it is.

The up/down counter 24 further has an output terminal Q and positive and negative polarity terminals $\overline{\text{QH}}$ and QH. The up/down counter 24 delivers to the output terminal Q an absolute value of the counted value. The up/down counter 24 delivers a logic "1" level signal to the positive and the negative polarity terminals $\overline{\text{QH}}$ and QH when the counted value has positive and negative polarities, respectively.

A combination of an identity gate 26 and an AND gate 27 determines an upper threshold value for the up/down counter 24 in the manner which will become clear as the description proceeds. The upper threshold value is higher than the initial value by a preselected value M, where M represents a second integer greater than one. Another combination of the identity gate 26 and an AND gate 28 determines a lower threshold value for the up/down counter 24 in the manner which will also become clear as the description proceeds. The lower threshold value is lower than the initial value by the preselected value M.

Connected to the output terminal Ω and supplied with the absolute value of the counted value and with the preselected value M, the identity gate 26 produces a logic "1" level signal when the absolute value becomes equal to the preselected value M. When the absolute value is not equal to the preselected value M, the identity gate 26 produces a logic "0" level signal.

Connected to the identity gate 26 and the positive polarity terminal $\overline{\text{QH}}$, the AND gate 27 produces a logic "1" level signal as the first judgement result signal 16 only when the AND gate 27 receives the logic "1" level signals from the identity gate 26 and the positive polarity terminal $\overline{\text{QH}}$. Connected to the identity gate 26 and the negative polarity terminal QH, the AND gate 28 produces a logic "1" level signal as the second judgement result signal 17 only when the AND gate 28 receives the logic "1" level signals from the identity gate 26 and the negative polarity terminal QH.

Figure 4:
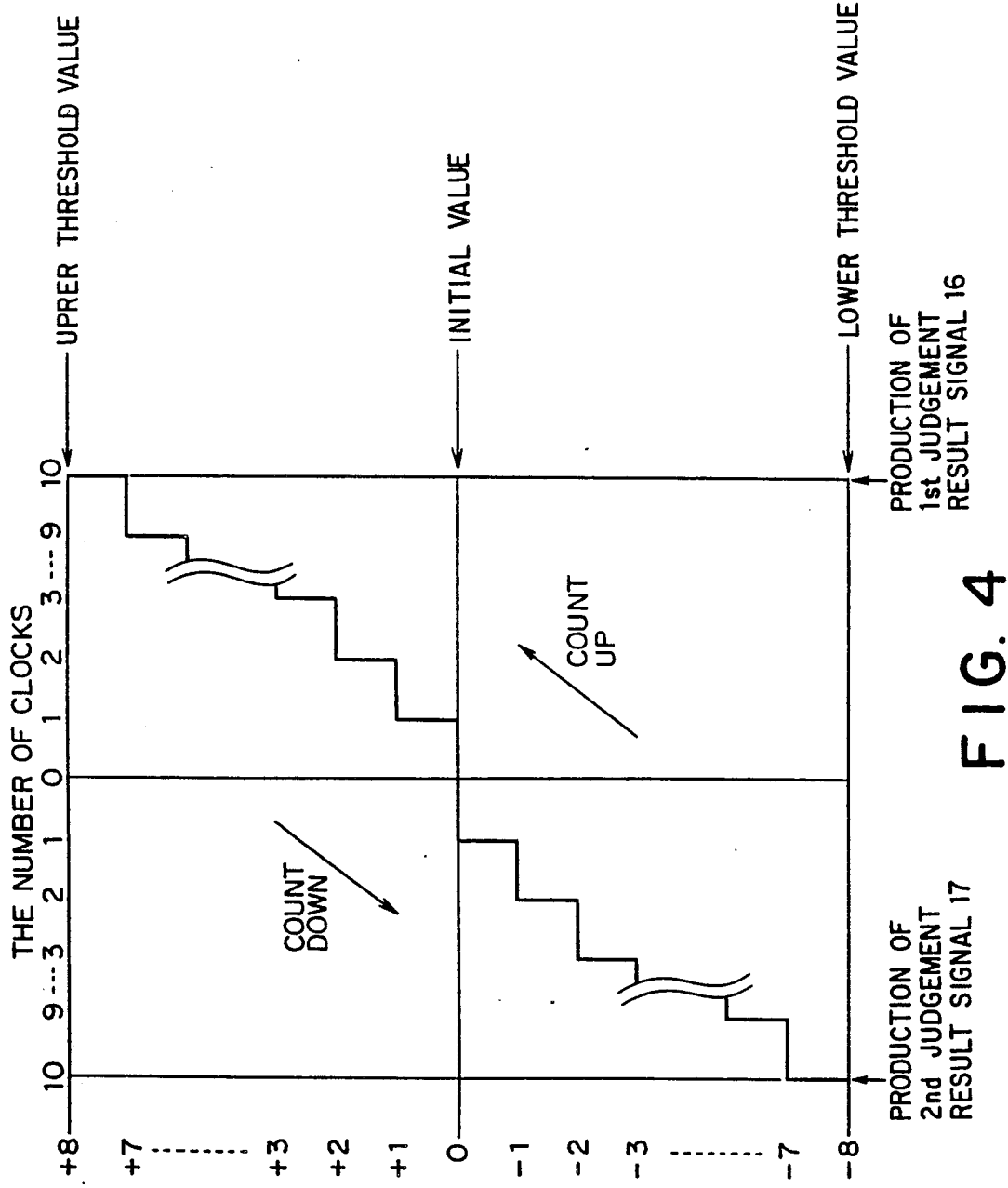
FIG. 4 is a view for use in describing operation of a counting circuit used in the polarity judging arrangement illustrated in FIG. 3.

Thus, the counting circuit 23 is connected to the first and the second synchronization word detecting circuits 21 and 22 and has the initial value and the upper and the lower threshold values. The counting circuit 23 counts down and up a count in response to the first and the second detection pulses F1P and FP, respectively, and produces the first and the second judgement result signals 16 and 17 when the count increases up to the upper threshold value and when the count decreases down to the lower threshold value, respectively. When the second integer M is equal to eight, the counting circuit 23 operates in the manner illustrated in FIG. 4. In this case, the initial value and the upper and the lower threshold values are equal to 0, +8, and −8, respectively.

In FIG. 3, the count up and the count down terminals UP and DOWN of the up/down counter 24 may be connected to the first and the second synchronization word detecting circuits 21 and 22, respectively. In this case, the counting circuit 23 counts up and down a count in response to the first and the second detection pulses F1P and FP, respectively, to produce the first and the second judgement result signals 16 and 17 when the count decreases down to the lower threshold value and when the count increases up to the upper threshold value, respectively.

With reference to FIG. 3 continued, a count stopping circuit 29 comprises an OR gate 30 and a flip-flop 31. Supplied with one of the first and the second judgement result signals 16 and 17 from the counting circuit 23, the OR gate 30 gives the flip-flop 31 the above-mentioned one of the first and the second judgement result signals 16 and 17 to make the flip-flop 31 produce the control signal 25 of a logic "1" level. As a result, the counting circuit 23 continuously produce the above-mentioned one of the first and the second judgement result signals 16 and 17.

Thus, the count stopping circuit 29 is connected to the counting circuit 23 for stopping the counting circuit 23 in response to one of the first and the second judgement result signals 16 and 17 to make the counting circuit 23 continuously produce the above-mentioned one of the first and the second judgement result signals 16 and 17 after reception of the above-mentioned one of the first and the second judgement result signals 16 and 17.

The first communication section 11 further comprises a synchronization establishment detecting circuit 32 connected to the first and the second synchronization word detecting circuits 21 and 22. Responsive to the first and the second detection pulses F1P and FP and supplied with the clock signal CLOCK, the synchronization establishment detecting circuit 32 detects synchronization establishment and produces a synchronization establishment signal SYNC.

A decoder 33 decodes the received digital signal into a decoded signal in synchronism with the clock signal CLOCK when the decoder 33 receives the first judgement result signal 16 from the counting circuit 23. When the decoder 33 receives the second judgement result signal 17 from the counting circuit 23, the decoder 33 inverts the received digital signal as an inverted signal and decodes the inverted signal into another decoded signal in synchronism with the clock signal CLOCK.

Turning back to FIG. 2, the polarity judging arrangement 10 illustrated in FIG. 3 is applicable to a case where each of the frame synchronization signals F of at least two of the second through the N-th frames of each multiframe represents the second predetermined synchronization word defined by inverting the first predetermined synchronization word represented by the multiframe synchronization signal F1.

Figure 5:
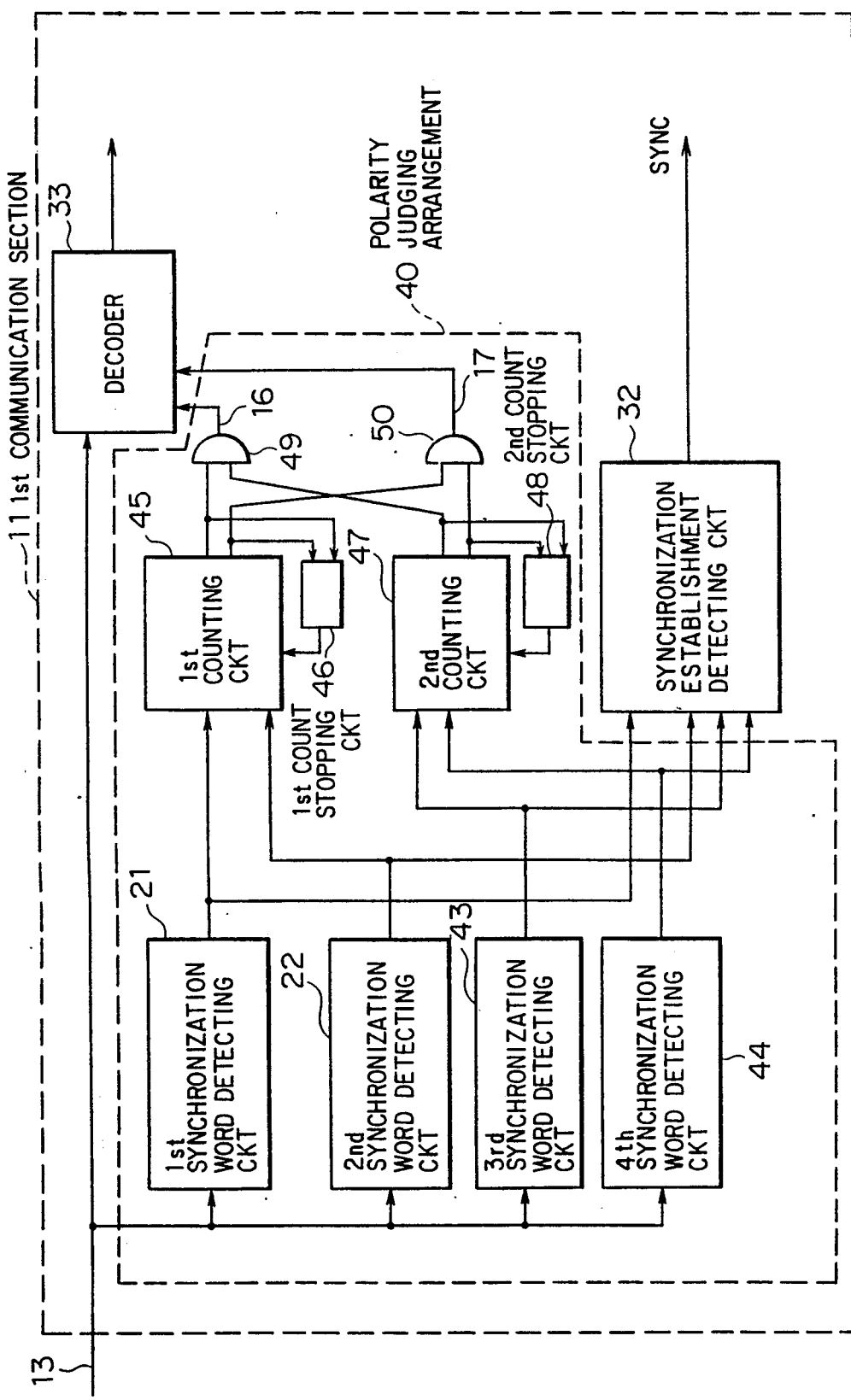
FIG. 5 is a block diagram of a first communication section comprising a polarity judging arrangement according to a second embodiment of this invention.

Turning to FIG. 5, a polarity judging arrangement 40 according to a second embodiment of this invention comprises similar parts designated by like reference numerals. The polarity judging arrangement 40 is also for use in the first communication section 11 which receives, as a received digital signal, a different time division multiplexed digital signal from the transmission line 13.

Turning back to FIG. 2 again, description will be made as regards the different time division multiplexed digital signal. For the different time division multiplexed digital signal, the first integer N is greater than five. In the different time division multiplexed digital signal, each of the frame synchronization signals F of at least two of the second through the N-th frames of each multiframe represents the second predetermined synchronization word defined by inverting the first predetermined synchronization word represented by the multiframe synchronization signal Fl. The frame synchronization signal F of at least one of the second through the N-th frames except the above-mentioned at least two of the second through the N-th frames of each multiframe represents a third predetermined synchronization word which is different from any one of the first and the second predetermined synchronization words. Each of the frame synchronization signals F of at least two remaining ones of the second through the N-th frames of each multiframe represents a fourth predetermined synchronization word defined by inverting the third predetermined synchronization word.

Turning back to FIG. 5, the polarity judging arrangement 40 comprises the first and the second synchronization word detecting circuits 21 and 22 like the polarity judging arrangement 10 illustrated in FIG. 3. The polarity judging arrangement 40 further comprises third and fourth synchronization word detecting circuits 43 and 44. Supplied with the received digital signal, the third synchronization word detecting circuit 43 detects the third predetermined synchronization word and produces a third detection pulse whenever the third synchronization word detecting circuit 43 detects the third predetermined synchronization word. Likewise, the fourth synchronization word detecting circuit 44 detects the fourth predetermined synchronization word and produces a fourth detection pulse whenever the fourth synchronization word detecting circuit 44 detects the fourth predetermined synchronization word.

A first counting circuit 45 is connected to the first and the second synchronization word detecting circuits 21 and 22 and has a first initial value, a first upper threshold value, and a lower threshold value. The first upper threshold value is higher than the first initial value by a preselected value M, where M represents a second integer greater than one. The first lower threshold value is lower than the first initial value by the preselected value M. The first counting circuit 45 counts down and up a first count in response to the first and the second detection pulses, respectively, and the produces first and second output signals when the first count increases up to the first upper threshold value and when the first count decreases down to the lower threshold value, respectively. Each of the first and the second output signals has a logic "1" level.

Connected to the first counting circuit 45, a first count stopping circuit 46 stops the first counting circuit 45 in response to one of the first and the second output signals to make the first counting circuit 45 continuously produce the above-mentioned one of the first and the second output signals after reception of the above-mentioned one of the first and the second output signals.

A second counting circuit 47 is connected to the third and the fourth synchronization word detecting circuit 43 and has a second initial value, a second upper threshold value, and a second lower threshold value. The second upper threshold value is higher than the second initial value by the preselected value M. The second lower threshold value is lower than the second initial value by the preselected value M. The second counting circuit 47 counts down and up a second count in response to the third and the fourth detection pulses, respectively, and produces third and fourth output signals when the second count increases up to the second upper threshold value and when the second count decreases down to the lower threshold value, respectively. Each of the third and the fourth output signals has a logic "1" level.

Connected to the second counting circuit 47, a second count stopping circuit 48 stops the second counting circuit 47 in response to one of the third and the fourth output signals and makes the second counting circuit 47 continuously produce the above-mentioned one of the third and the fourth output signals after reception of the above-mentioned one of the third and the fourth output signals.

Each of the first and the second counting circuits 45 and 47 is equivalent in structure to the counting circuit 23 illustrated in FIG. 3. Each of the first and the second count stopping circuits 46 and 48 is equivalent in structure to the count stopping circuit 29 illustrated in FIG. 3.

A first AND gate 49 produces the first judgement result signal 16 of a logic "1" level while the first AND gate 49 receives the first and the third output signals. Likewise, a second AND gate 50 produces the second judgement result signal 17 of a logic "1" level while the second AND gate 49 receives the second and the fourth output signals.

Thus, a combination of the first and the second AND gates 49 and 50 serves as a judgement result signal producing circuit. Connected to the first and the second counting circuits 45 and 47, the judgement result signal producing circuit produces the first and the second judgement result signals 16 and 17 while the judgement result signal producing circuit receives the first and the third output signals and while the judgement result signal producing circuit receives the second and the fourth output signals, respectively.

In the illustrated first communication section 11, the synchronization establishment detecting circuit 32 is connected to the first through the fourth synchronization word detecting circuits 21, 22, 43 and 44. Responsive to the first through the fourth detection pulses, the synchronization establishment detecting circuit 32 detects synchrnization establishment and produces a synchronization establishment signal SYNC.

While this invention has thus far been described in conjunction with a few preferred embodiments thereof, it will readily be possible for those skilled in the art to put this invention into practice in various other manners. For example, a different counting circuit may be used instead of the first counting circuit 45 illustrated in FIG. 5. The different counting circuit counts up and down a count in response to the first and the second detection pulses, respectively, to produce the first and the second output signals when the count decreases down to the lower threshold value and when the count increases up to the upper threshold value, respectively. In addition, another different counting circuit may be used instead of the second counting circuit 47 illustrated in FIG. 5. The other different counting circuit counts up and down a count in response to the third and the fourth detection pulses, respectively, to produce the third and the fourth output signals when the count decreases down to the lower threshold value and when the count increases up to the upper threshold value, respectively. In FIG. 5, the polarity judging arrangement 40 may comprise an increased number K of a pair of the synchronization word detecting circuits and an increased number K of a combination of the counting circuit and the count stopping circuit when the time division multiplexed digital signal comprises an increased number K of a pair of synchronization words having inverse polarities relative to each other, where K represents a positive integer greater than two.

What is claimed is:

1. A polarity judging arrangement for use in a reception section of a digital transmission network comprising a transmission section and a transmission line between said transmission and said reception sections, said transmission section transmitting to said transmission line a time division multiplexed digital signal comprising successive multiframes, each comprising first, second, . . . , and N-th frames, where N represents a first integer greater than two, the first frame of each multiframe comprising a multiframe synchronization signal representative of a first predetermined synchronization word and a transmission data signal which succeeds said multiframe synchronization signal, each of said second through said N-th frames of each multiframe comprising a frame synchronization signal representative of a second predetermined synchronization word and another transmission data signal which succeeds said frame synchronization signal, said second predetermined synchronization word being defined by inverting said first predetermined synchronization word, said reception section receiving, as a received digital signal, said time division multiplexed digital signal from said transmission line, said received digital signal having a true polarity equivalent to a polarity of said time division multiplexed digital signal when said transmission line is correctly connected in polarity between said transmission and said reception sections, said received digital signal having an inverted polarity relative to said true polarity when said transmission line is incorrectly connected in polarity between said transmission and said reception sections, said polarity judging arrangement being for judging whether said received digital signal has said true polarity or said inverted polarity, said polarity judging arrangement thereby producing first and second judgement result signals when said polarity judging arrangement judges that said received digital signal has said true polarity and that said received digital signal has said inverted polarity, respectively, said first and said second judgement result signals representing that said received digital signal has said true polarity and that said received digital signal has said inverted polarity, respectively, said polarity judging arrangement comprising:

first synchronization word detecting means supplied with said received digital signal for detecting said first predetermined synchronization word to produce a first detection pulse whenever said first synchronization word detecting means detects said first predetermined synchronization word;

second synchronization word detecting means supplied with said received digital signal for detecting said second predetermined synchronization word to produce a second detection pulse whenever said second synchronization word detecting means detects said second predetermined synchronization word; and counting means connected to said first and said second synchronization word detecting means and having an initial value, an upper threshold value, and a lower threshold value, said upper threshold value being higher than said initial value by a preselected value M, where M represents a second integer greater than one, said lower threshold value being lower than said initial value by said preselected value, said counting means being for counting down and up a count in response to said first and said second detection pulses, respectively, to produce said first and said second judgement result signals when said count increases up to said upper threshold value and when said count decreases down to said lower threshold value, respectively.

2. A polarity judging arrangement as claimed in claim 1, further comprising:

count stopping means connected to said counting means for stopping said counting means in response to one of said first and said second judgement result signals to make said counting means continuously produce said one of the first and the second judgement result signals after reception of said one of the first and the second judgement result signals.

3. A polarity judging arrangement for use in a reception section of a digital transmission network comprising a transmission section and a transmission line between said transmission and said reception sections, said transmission section transmitting to said transmission line a time division multiplexed digital signal comprising successive multiframes, each comprising first, second, . . . , and N-th frames, where N represents a first integer greater than two, the first frame of each multiframe comprising a multiframe synchronization signal representative of a first predetermined synchronization word and a transmission data signal which succeeds said multiframe synchronization signal, each of said second through said N-th frames of each multiframe comprising a frame synchronization signal representative of a second predetermined synchronization word and another transmission data signal which succeeds said frame synchronization signal, said second predetermined synchronization word being defined by inverting said first predetermined synchronization word, said reception section receiving, as a received digital signal, said time division multiplexed digital signal from said transmission line, said received digital signal having a true polarity equivalent to a polarity of said time division multiplexed digital signal when said transmission line is correctly connected in polarity between said transmission and said reception sections, said received digital signal having an inverted polarity relative to said true polarity when said transmission line is incorrectly connected in polarity between said transmission and said reception sections, said polarity judging arrangement being for judging whether said received digital signal has said true polarity or said inverted polarity, said polarity judging arrangement thereby producing first and second judgement result signals when said polarity judging arrangement judges that said received digital signal has said true polarity and that said received digital signal has said inverted polarity, respectively, said first and said second judgement result signals representing that said received digital signal has said true polarity and that said received digital signal has said inverted polarity, respectively, said polarity judging arrangement comprising:

first synchronization word detecting means supplied with said received digital signal for detecting said first predetermined synchronization word to produce a first detection pulse whenever said first synchronization word detecting means detects said first predetermined synchronization word;

second synchronization word detecting means supplied with said received digital signal for detecting said second predetermined synchronization word to produce a second detection pulse whenever said second synchronization word detecting means detects said second predetermined synchronization word; and counting means connected to said first and said second synchronization word detecting means and having an initial value, an upper threshold value, and a lower threshold value, said upper threshold value being higher than said initial value by a preselected value M, where M represents a second integer greater than one, said lower threshold value being lower than said initial value by said preselected value, said counting means being for counting up and down a count in response to said first and said second detection pulses, respectively, to produce said first and said second judgement result signals when said count decreases down to said lower threshold value and when said count increases up to said upper threshold value, respectively.

4. A polarity judging arrangement as claimed in claim 3, further comprising:

count stopping means connected to said counting means for stopping said counting means in response to one of said first and said second judgement result signals to make said counting means continuously produce said one of the first and the second judgement result signals after reception of said one of the first and the second judgement result signals.

5. A polarity judging arrangement for use in a reception section of a digital transmission network comprising a transmission section and a transmission line between said transmission and said reception sections, said transmission section transmitting to said transmission line a time division multiplexed digital signal comprising successive multiframes, each comprising first, second, . . . , and N-th frames, where N represents a first integer greater than two, the first frame of each multiframe comprising a multiframe synchronization signal representative of a first predetermined synchronization word and a transmission data signal which succeeds said multiframe synchronization signal, each of said second through said N-th frames of each multiframe comprising a frame synchronization signal and another transmission data signal which succeeds said frame synchronization signal, each of the frame synchronization signals of at least two of said second through said N-th frames of each multiframe representing a second predetermined synchronization word defined by inverting said first predetermined synchronization word, said reception section receiving, as a received digital signal, said time division multiplexed digital signal from said transmission line, said received digital signal having a true polarity equivalent to a polarity of said time division multiplexed digital signal when said transmission line is correctly connected in polarity between said transmission and said reception sections, said received digital signal having an inverted polarity relative to said true polarity when said transmission line is incorrectly connected in polarity between said transmission and said reception sections, said polarity judging arrangement being for judging whether said received digital signal has said true polarity or said inverted polarity, said polarity judging arrangement thereby producing first and second judgement result signals when said polarity judging arrangement judges that said received digital signal has said true polartiy and that said received digital signal has said inverted polarity, respectively, said first and said second judgement result signals representing that said received digital signal has said true polarity and that said received digital signal has said inverted polarity, respectively, said polarity judging arrangement comprising:

first synchronization word detecting means supplied with said received digital signal for detecting said first predetermined synchronization word to produce a first detection pulse whenever said first synchronization word detecting means detects said first predetermined synchronization word;

second synchronization word detecting means supplied with said received digital signal for detecting said second predetermined synchronization word to produce a second detection pulse whenever said second synchronization word detecting means detects said second predetermined synchronization word; and counting means connected to said first and said second synchronization word detecting means and having an initial value, an upper threshold value, and a lower threshold value, said upper threshold value being higher than said initial value by a preselected value M, where M represents a second integer greater than one, said lower threshold value being lower than said initial value by said preselected value, said counting means being for counting down and up a count in response to said first and said second detection pulses, respectively, to produce said first and said second judgement result signals when said count increases up to said upper threshold value and when said count decreases down to said lower threshold value, respectively.

6. A polarity judging arrangement as claimed in claim 5, further comprising:

count stopping means connected to said counting means for stopping said counting means in response to one of said first and said second judgement result signals to make said counting means continuously produce said one of the first and the second judgement result signals after reception of said one of the first and the second judgement result signals.

7. A polarity judging arrangement for use in a reception section of a digital transmission network comprising a transmission section and a transmission line between said transmission and said reception sections, said transmission section transmitting to said transmission line a time division multiplexed digital signal comprising successive multiframes, each comprising first, second, . . . , and N-th frames, where N represents a first integer greater than two, the first frame of each multiframe comprising a multiframe synchronization signal representative of a first predetermined synchronization word and a transmission data signal which succeeds said multiframe synchronization signal, each of said second through said N-th frames of each multiframe comprising a frame synchronization signal and another transmission data signal which succeeds said frame synchronization signal, each of the frame synchronization signals of at least two of said second through said N-th frames of each multiframe representing a second predetermined synchronization word defined by inverting said first predetermined synchronization word, said reception section receiving, as a received digital signal, said time division multiplexed digital signal from said transmission line, said received digital signal having a true polarity equivalent to a polarity of said time division multiplexed digital signal when said transmission line is correctly connected in polarity between said transmission and said reception sections, said received digital signal having an inverted polarity relative to said true polarity when said transmission line is incorrectly connected in polarity between said transmission and said reception sections, said polarity judging arrangement being for judging whether said received digital signal has said true polarity or said inverted polarity, said polarity judging arrangement thereby producing first and second judgement result signals when said polarity judging arrangement judges that said received digital signal has said true polarity and that said received digital signal has said inverted polarity, respectively, said first and said second judgement result signals representing that said received digital signal has said true polarity and that said received digital signal has said inverted polarity, respectively, said polarity judging arrangement comprising:

first synchronization word detecting means supplied with said received digital signal for detecting said first predetermined synchronization word to produce a first detection pulse whenever said first synchronization word detecting means detects said first predetermined synchronization word;

second synchronization word detecting means supplied with said received digital signal for detecting said second predetermined synchronization word to produce a second detection pulse whenever said second synchronization word detecting means detects said second predetermined synchronization word; and counting means connected to said first and said second synchronization word detecting means and having an initial value, an upper threshold value, and a lower threshold value, said upper threshold value being higher than said initial value by a preselected value M, where M represents a second integer greater than one, said lower threshold value being lower than said initial value by said preselected value, said counting means being for counting up and down a count in response to said first and said second detection pulses, respectively, to produce said first and said second judgement result signals when said count decreases down to said lower threshold value and when said count increases up to said upper threshold value, respectively.

8. A polarity judging arrangement as claimed in claim 7, further comprising:

count stopping means connected to said counting means for stopping said counting means in response to one of said first and said second judgement result signals to make said counting means continuously produce said one of the first and the second judgement result signals after reception of said one of the first and the second judgement result signals.

9. A polarity judging arrangement for use in a reception section of a digital transmission network comprising a transmission section and a transmission line between said transmission and said reception sections, said transmission section transmitting to said transmission line a time division multiplexed digital signal comprising successive multiframes, each comprising first, second, . . . , and N-th frames, where N represents a first integer greater than five, the first frame of each multiframe comprising a multiframe synchronization signal of a first predetermined synchronization word and a transmission data signal which succeeds said multiframe synchronization signal, each of said second through said N-th frames of each multiframe comprising a frame synchronization signal and another transmission data signal which succeeds said frame synchronization signal, each of the frame synchronization signals of at least two of said second through said N-th frames of each multiframe representing a second predetermined synchronization word defined by inverting said first predetermined synchronization word, the frame synchronization signal of at least one of said second through said N-th frames except said at least two of said second through said N-th frames of each multiframe representing a third predetermined synchronization word which is different from any one of said first and said second predetermined synchronization words, each of the frame synchronization signals of at least two remaining ones of said second through said N-th frames of each multiframe representing a fourth predetermined synchronization word defined by inverting said third predetermined synchronization word, said reception section receiving, as a received digital signal, said time division multiplexed digital signal from said transmission line, said received digital signal having a true polarity equivalent to a polarity of said time division multiplexed digital signal when said transmission line is correctly connected in polarity between said transmission and said reception sections, said received digital signal having an inverted polarity relative to said true polarity when said transmission line is incorrectly connected in polarity between said transmission and said reception sections, said polarity judging arrangement being for judging whether said received digital signal has said true polarity or said inverted polarity, said polarity judging arrangement thereby producing first and second judgement result signals when said polarity judging arrangement judges that said received digital signal has said true polarity and that said received digital signal has said inverted polarity, respectively, said first and said second judgement result signals representing that said received digital signal has said true polarity and that said received digital signal has said inverted polarity, respectively, said polarity judging arrangement comprising:

first synchronization word detecting means supplied with said received digital signal for detecting said first predetermined synchronization word to produce a first detection pulse whenever said first synchronization word detecting means detects said first predetermined synchronization word;

second synchronization word detecting means supplied with said received digital signal for detecting said second predetermined synchronization word to produce a second detection pulse whenever said second synchronization word detecting means detects said second predetermined synchronization word;

third synchronization word detecting means supplied with said received digital signal for detecting said third predetermined synchronization word to produce a third detection pulse whenever said third synchronization word detecting means detects said third predetermined synchronization word;

fourth synchronization word detecting means supplied with said received digital signal for detecting said fourth predetermined synchronization word to produce a fourth detection pulse whenever said fourth synchronization word detecting means detects said fourth predetermined synchronization word;

first counting means connected to said first and said second synchronization word detecting means and having a first initial value, a first upper threshold value, and a lower threshold value, said first upper threshold value being higher than said first initial value by a preselected value M, where M represents a second integer greater than one, said first lower threshold value being lower than said first initial value by said preselected value, said first counting means being for counting down and up a first count in response to said first and said second detection pulses, respectively, to produce first and second output signals when said first count increases up to said first upper threshold value and when said first count decreases down to said lower threshold value, respectively;

first count stopping means connected to said first counting means for stopping said first counting means in response to one of said first and said second output signals to make said first counting means continuously produce said one of the first and the second output signals after reception of said one of the first and the second output signals;

second counting means connected to said third and said fourth synchronization word detecting means and having a second initial value, a second upper threshold value, and a second lower threshold value, said second upper threshold value being higher than said second initial value by said preselected value, said second lower threshold value being lower than said second initial value by said preselected value, said second counting means being for counting down and up a second count in response to said third and said fourth detection pulses, respectively, to produce third and fourth output signals when said second count increases up to said second upper threshold value and when said second count decreases down to said lower threshold value, respectively;

second count stopping means connected to said second counting means for stopping said second counting means in response to one of said third and said fourth output signals to make said second counting means continuously produce said one of the third and the fourth output signals after reception of said one of the third and the fourth output signals; and judgement result signal producing means connected to said first and said second counting means for producing said first and said second judgement result signals while said judgement result signal producing means receives said first and said third output signals and while said judgement result signal producing means receives said second and said fourth output signals, respectively.

10. A polarity judging arrangement for use in a reception section of a digital transmission network comprising a transmission section and a transmission line between said transmission and said reception sections, said transmission section transmitting to said transmission line a time division multiplexed digital signal comprising successive multiframes, each comprising first, second, . . . , and N-th frames, where N represents a first integer greater than five, the first frame of each multiframe comprising a multiframe synchronization signal of a first predetermined synchronization word and a transmission data signal which succeeds said multiframe synchronization signal, each of said second through said N-th frames of each multiframe comprising a frame synchronization signal and another transmission data signal which succeeds said frame synchronization signal, each of the frame synchronization signals of at least two of said second through said N-th frames of each multiframe representing a second predetermined synchronization word defined by inverting said first predetermined synchronization word, the frame synchronization signal of at least one of said second through said N-th frames except said at least two of said second through said N-th frames of each multiframe representing a third predetermined synchronization word which is different from any one of said first and said second predetermined synchronization words, each of the frame synchronization signals of at least two remaining ones of said second through said N-th frames of each multiframe representing a fourth predetermined synchronization word defined by inverting said third predetermined synchronization word, said reception section receiving, as a received digital signal, said time division multiplexed digital signal from said transmission line, said received digital signal having a true polarity equivalent to a polarity of said time division multiplexed digital signal when said transmission line is correctly connected in polarity between said transmission and said reception sections, said received digital signal having an inverted polarity relative to said true polarity when said transmission line is incorrectly connected in polarity between said transmission and said reception sections, said polarity judging arrangement being for judging whether said received digital signal has said true polarity or said inverted polarity, said polarity judging arrangement thereby producing first and second judgement result signals when said polarity judging arrangement judges that said received digital signal has said true polarity and that said received digital signal has said inverted polarity, respectively, said first and said second judgement result signals representing that said received digital signal has said true polarity and that said received digital signal has said inverted polarity, respectively, said polarity judging arrangement comprising:

first synchronization word detecting means supplied with said received digital signal for detecting said first predetermined synchronization word to produce a first detection pulse whenever said first synchronization word detecting means detects said first predetermined synchronization word;

second synchronization word detecting means supplied with said received digital signal for detecting said second predetermined synchronization word to produce a second detection pulse whenever said second synchronization word detecting means detects said second predetermined synchronization word;

third synchronization word detecting means supplied with said received digital signal for detecting said third predetermined synchronization word to produce a third detection pulse whenever said third synchronization word detecting means detects said third predetermined synchronization word;

fourth synchronization word detecting means supplied with said received digital signal for detecting said fourth predetermined synchronization word to produce a fourth detection pulse whenever said fourth synchronization word detecting means detects said fourth predetermined synchronization word;

first counting means connected to said first and said second synchronization word detecting means and having a first initial value, a first upper threshold value, and a lower threshold value, said first upper threshold value being higher than said first initial value by a preselected value M, where M represents a second integer greater than one, said first lower threshold value being lower than said first initial value by said preselected value, said first counting means being for counting up and down a first count in response to said first and said second detection pulses, respectively, to produce first and second output signals when said first count decreases down to said first lower threshold value and when said first count increases up to said upper threshold value, respectively;

first count stopping means connected to said first counting means for stopping said first counting means in response to one of said first and said second output signals to make said first counting means continuously produce said one of the first and the second output signals after reception of said one of the first and the second output signals;

second counting means connected to said third and said fourth synchronization word detecting means and having a second initial value, a second upper threshold value, and a second lower threshold value, said second upper threshold value being higher than said second initial value by said preselected value, said second lower threshold value being lower than said second initial value by said preselected value, said second counting means being for counting up and down a second count in response to said third and said fourth detection pulses, respectively, to produce third and fourth output signals when said second count decreases down to said second lower threshold value and when said second count increases up to said upper threshold value, respectively;

second count stopping means connected to said second counting means for stopping said second counting means in response to one of said third and said fourth output signals to make said second counting means continuously produce said one of the third and the fourth output signals after reception of said one of the third and the fourth output signals; and judgement result signal producing means connected to said first and said second counting means for producing said first and said second judgement result signals while said producing means receives said first and said third output signals and while said producing means receives said second and said fourth output signals, respectively.

* * * * *